United States Patent
Saiki et al.

(10) Patent No.: US 9,758,945 B2
(45) Date of Patent: Sep. 12, 2017

(54) UPPER SLEWING BODY OF CONSTRUCTION MACHINE

(71) Applicant: KOBELCO CONSTRUCTION MACHINERY CO., LTD., Hiroshima-shi (JP)

(72) Inventors: Seiji Saiki, Hiroshima (JP); Kazushige Koiwai, Hiroshima (JP); Seiichi Onishi, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 15/091,012

(22) Filed: Apr. 5, 2016

(65) Prior Publication Data

US 2016/0305090 A1 Oct. 20, 2016

(30) Foreign Application Priority Data

Apr. 16, 2015 (JP) ................. 2015-084245

(51) Int. Cl.
*E02F 9/10* (2006.01)
*E02F 9/08* (2006.01)
(Continued)

(52) U.S. Cl.
CPC .................. *E02F 9/10* (2013.01); *B60K 6/20* (2013.01); *E02F 9/0833* (2013.01);
(Continued)

(58) Field of Classification Search
CPC .............. E02F 9/10; E02F 9/0858; E02F 9/12
See application file for complete search history.

(56) References Cited

U.S. PATENT DOCUMENTS 9,107,286 B2 * 8/2015 Tsuchiya ............... E02F 9/0858
9,160,208 B2 * 10/2015 Murata ................ E02F 9/0858
(Continued)

FOREIGN PATENT DOCUMENTS

JP 2005-133494 A 5/2005
JP 2011-20833 A 2/2011
(Continued)

OTHER PUBLICATIONS

Extended European Search Report issued Aug. 19, 2016 in Patent Application No. 16164612.0.
(Continued)

*Primary Examiner* — Brian Swenson
(74) *Attorney, Agent, or Firm* — Oblon, McClelland, Maier & Neustadt, L.L.P.

(57) ABSTRACT

An upper slewing body 3 includes: a bottom plate rotatably attached to a lower traveling body; supporting frames and standing on the bottom plate; an engine supported on the bottom plate by the supporting frames; a generator motor connected to the engine; and a terminal box including a terminal, which is electrically connected to the generator motor and allows a cable to be connected, and a box main body housing the terminal and being attached to the generator motor. The generator motor includes a facing section facing the bottom plate at a position separated from the supporting frames in a plan view. The terminal box is arranged between the facing section of the generator motor and the bottom plate.

6 Claims, 6 Drawing Sheets

(51) Int. Cl.
    *B60K 6/20*     (2007.10)
    *E02F 9/20*     (2006.01)

(52) U.S. Cl.
    CPC .......... *E02F 9/0858* (2013.01); *E02F 9/0866* (2013.01); *E02F 9/2095* (2013.01); *Y10S 903/902* (2013.01)

(56) References Cited

U.S. PATENT DOCUMENTS

| | | | |
|---|---|---|---|
| 9,422,691 B2* | 8/2016 | Ueta | E02F 9/0866 |
| 2010/0148894 A1* | 6/2010 | Ohashi | H02K 55/02 |
| | | | 335/216 |
| 2011/0073402 A1 | 3/2011 | Manabe et al. | |
| 2011/0304169 A1* | 12/2011 | Nakayoshi | B60R 16/0239 |
| | | | 296/37.15 |
| 2013/0134807 A1 | 5/2013 | Murata et al. | |
| 2014/0021781 A1 | 1/2014 | Satake et al. | |
| 2015/0224886 A1 | 8/2015 | Kakizaki | |
| 2016/0153172 A1* | 6/2016 | Naito | B60K 1/00 |
| | | | 180/65.21 |

FOREIGN PATENT DOCUMENTS

| | | |
|---|---|---|
| JP | 2012-213280 A | 11/2012 |
| JP | 2012-213281 | 11/2012 |
| JP | 2013-241792 A | 12/2013 |
| WO | WO 2014/045455 A1 | 3/2014 |

OTHER PUBLICATIONS

Japanese Office Action dated Apr. 11, 2017 in Patent Application No. 2015-084245 (with English translation).

\* cited by examiner

FIG. 1

FRONT ←→ REAR

UPPER SLEWING BODY OF CONSTRUCTION MACHINE

TECHNICAL FIELD

The present invention relates to a construction machine including an engine and a generator motor connected to the engine.

BACKGROUND ART

As an example of such construction machines, a hybrid construction machine described in Japanese Unexamined Patent Publication No. 2012-213281 is known.

The hybrid construction machine includes a terminal box attached to a generator motor so as to allow a cable to be connected.

The terminal box includes a terminal (connector) which is electrically connected to the generator motor and to which a cable is connectible and a box main body which houses the terminal. Due to connection of a cable to the terminal of the terminal box, the generator motor and an external device (inverter) are electrically connected to each other.

The generator motor includes a stator, a rotor, and a housing that houses the stator and the rotor.

The terminal box is fixed to the housing at a position which is on a rear side of the housing of the generator motor and which is between a rotary shaft of the generator motor and an upper surface of the housing.

However, with the hybrid construction machine described in Japanese Unexamined Patent Publication No. 2012-213281, the terminal box protrudes rearward and upward from the generator motor.

Therefore, a space around the generator motor in a plan view and a space above the generator motor are limited by the terminal box and a degree of freedom of layout of other devices in these spaces declines.

SUMMARY OF INVENTION

An object of the present invention is to provide an upper slewing body of a construction machine on which a terminal box can be arranged while preventing a degree of freedom of layout of devices from declining.

In order to solve the problem described above, the present invention provides an upper slewing body of a construction machine rotatably provided on a lower traveling body of the construction machine, the upper slewing body of a construction machine including: a bottom plate rotatably attached to the lower traveling body; a pair of supporting frames standing on the bottom plate; an engine supported on the bottom plate by the pair of supporting frames; a generator motor connected to the engine; and a terminal box including at least one terminal, which is electrically connected to the generator motor and allows cable to be connected, and a box main body housing the at least one terminal and being attached to the generator motor, wherein the generator motor includes a facing section facing the bottom plate at a position separated from the supporting frames in a plan view, and the terminal box is arranged between the facing section of the generator motor and the bottom plate.

According to the present invention, a terminal box can be arranged while preventing a degree of freedom of layout of devices from declining.

DESCRIPTION OF EMBODIMENT

Hereinafter, an embodiment of the present invention will be described with reference to the accompanying drawings. It should be noted that the embodiment described below is merely a concrete example of the present invention and is not intended to limit the technical scope of the present invention.

Figure 1:
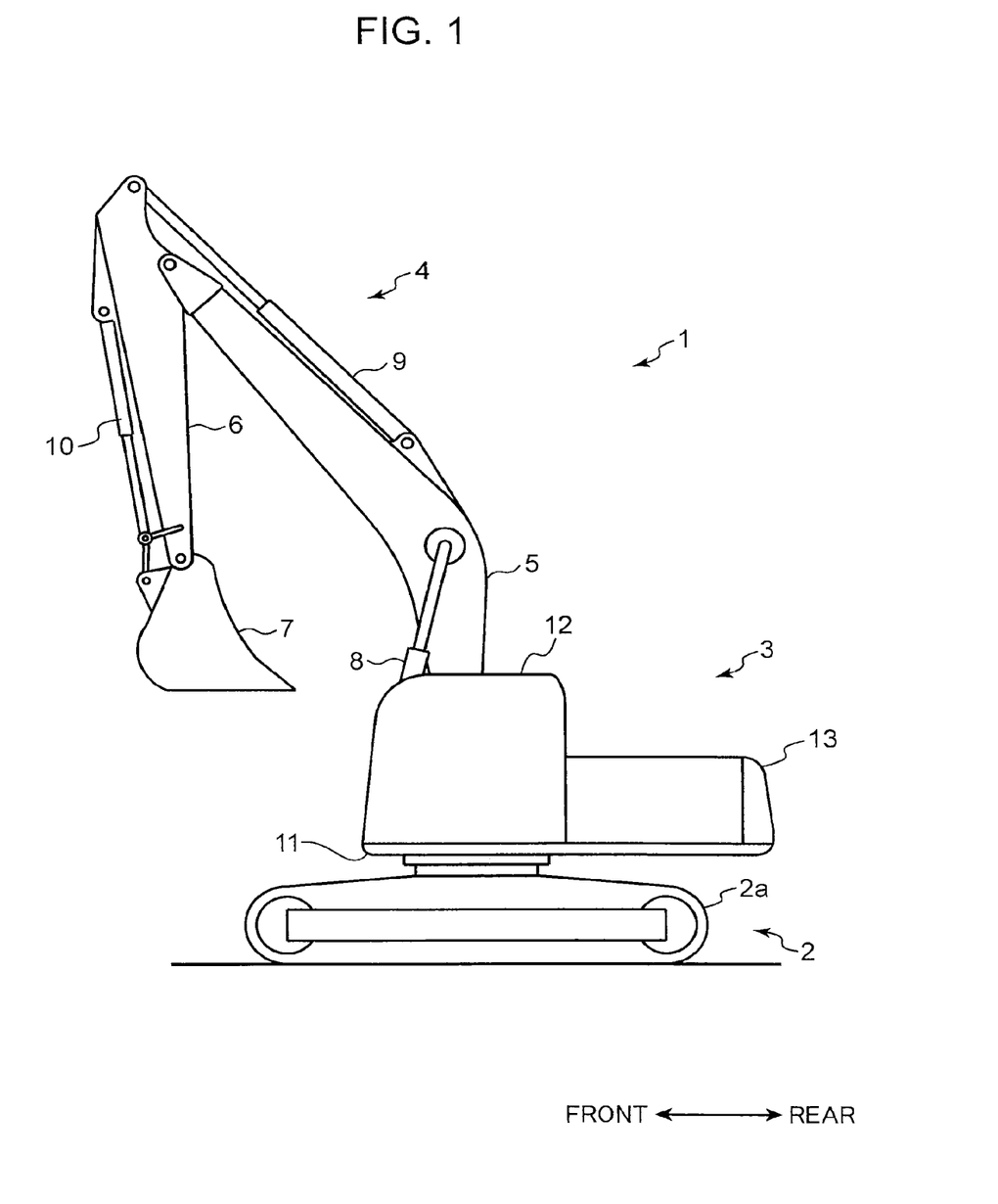
FIG. 1 is a side view showing an overall configuration of a hybrid shovel according to an embodiment of the present invention.

With reference to FIG. 1, a hybrid shovel 1 as an example of a construction machine according to the present invention includes a lower traveling body 2 having a crawler 2a, an upper slewing body 3 rotatably provided on the lower traveling body, and an attachment 4 attached to the upper slewing body 3.

The attachment 4 includes a boom 5 having a base end section rotatably attached to the upper slewing body 3, an arm 6 having a base end section rotatably attached to a distal end section of the boom 5, and a bucket 7 rotatably attached to a distal end section of the arm 6.

In addition, the attachment 4 includes a boom cylinder 8 which drives the boom 5 to be rotated with respect to the upper slewing body 3, an arm cylinder 9 which drives the arm 6 to be rotated with respect to the boom 5, and a bucket cylinder 10 which drives the bucket 7 to be rotated with respect to the arm 6.

Figure 2:
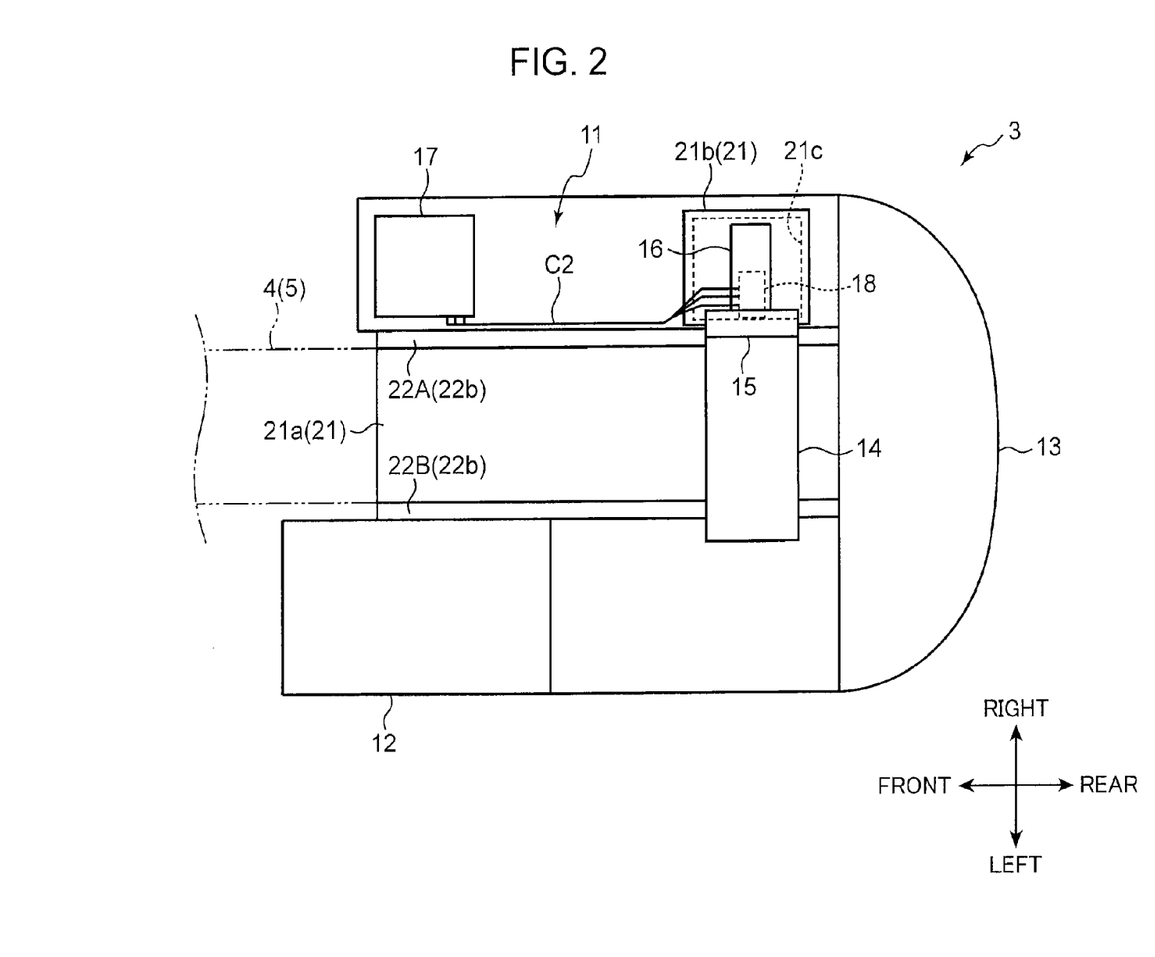
FIG. 2 is a plan view of an upper slewing body shown in FIG. 1 from which a panel covering a constitution on an upper frame is omitted.

With reference to FIGS. 1 and 2, the upper slewing body 3 includes an upper frame 11 provided on the lower traveling body 2, and a cab 12, a counterweight 13, an engine 14, a generator motor 15, a hydraulic pump 16, an inverter (connecting device) 17, a terminal box 18, and an exhaust gas post-treatment device 19 (refer to FIG. 3) respectively provided on the upper frame 11. Hereinafter, a direction as viewed by an operator seated on a driver's seat in the cab 12 will be used. Moreover, in FIG. 2, a panel which covers the constitution provided on the upper frame 11 from above is omitted.

Figure 3:
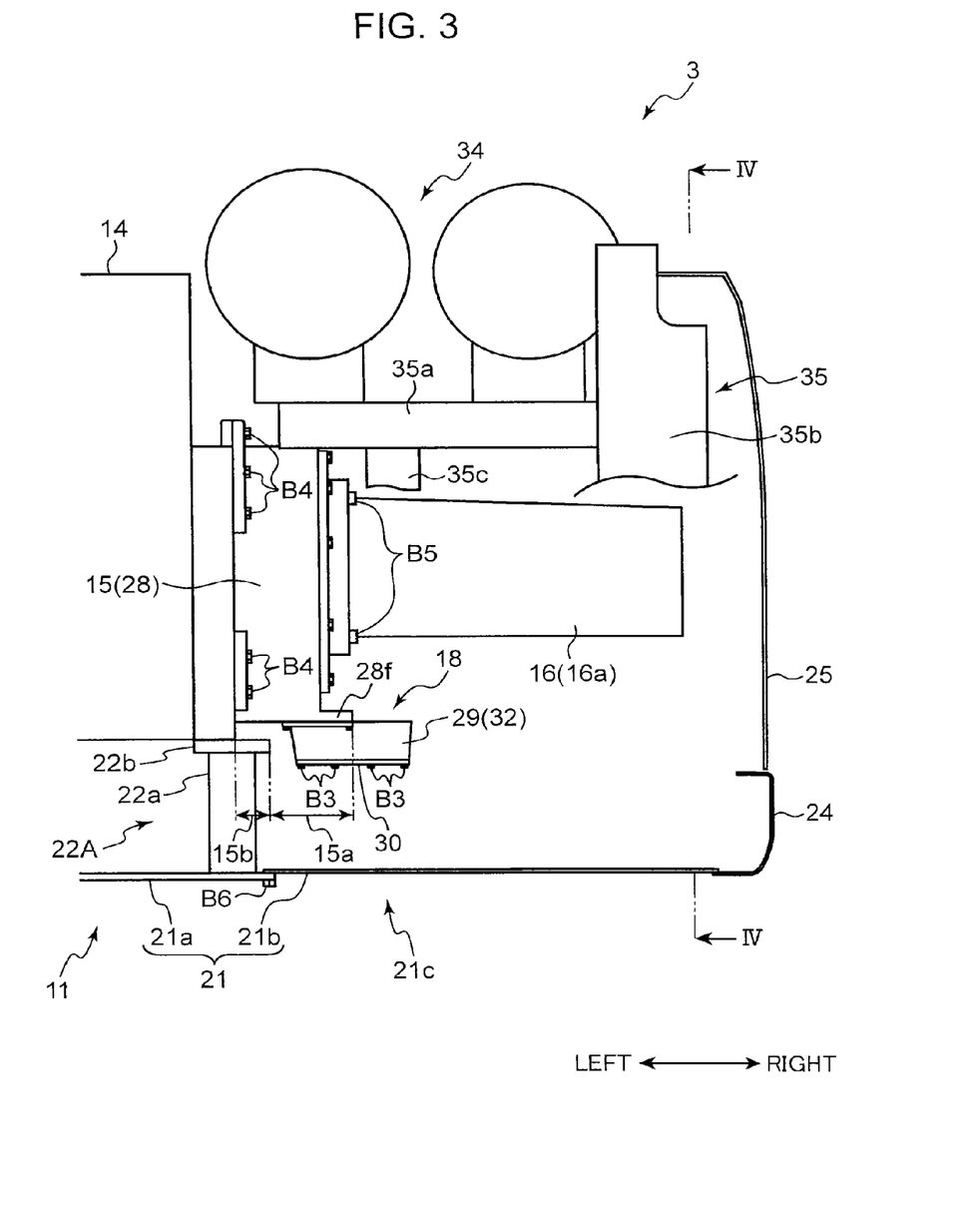
FIG. 3 is a rear view of the upper slewing body shown in FIG. 2 as viewed from behind from which a counterweight is omitted.

With reference to FIGS. 2 and 3, the upper frame 11 includes a bottom plate 21 rotatably provided on the lower traveling body 2, a pair of supporting frames 22A and 22B standing on the bottom plate 21, and a reinforcing frame 24 provided on a side edge portion of the bottom plate 21. Furthermore, a guard panel 25 for covering the constitution on the upper frame 11 from lateral side is provided on the reinforcing frame 24.

The bottom plate 21 includes a bottom plate main body 21a having an opening 21c and a cover 21b detachably attached to the bottom plate main body 21a by a bolt B6 (refer to FIG. 3) so as to close the opening 21c. The bottom plate main body 21a is rotatably attached to the lower traveling body 2.

The supporting frames 22A and 22B extend from a front part of the bottom plate 21 to a rear part of the bottom plate 21 so as to divide a space above the bottom plate 21 into three spaces (a space on a right side of the supporting frame 22A, a space between both supporting frames 22A and 22B, and a space on a left side of the supporting frame 22B) in a plan view, and oppose each other in a left-right direction. Since configurations of the respective supporting frames 22A and 22B are the same, hereinafter, only the configuration of the right-side supporting frame 22A will be described.

The supporting frame 22A includes a vertical plate 22a standing on the bottom plate main body 21a and a back plate 22b welded to an upper end surface of the vertical plate 22a. The vertical plate 22a extends from a front part to a rear part of the bottom plate main body 21a. The back plate 22b is arranged along a direction that intersects the vertical plate 22a in order to reinforce the vertical plate 22a, and includes a right end part that protrudes to a right side of the vertical plate 22a and a left end part that protrudes to a left side of the vertical plate 22a.

The cab 12 is provided on a left side of the left-side supporting frame 22B and in a front part of the bottom plate 21.

The counterweight 13 is provided in a rear part of the bottom plate 21 approximately across an entire region of the bottom plate 21 in a left-right direction.

The engine 14 is provided in front of the counterweight 13 and is supported on the bottom plate 21 by the pair of supporting frames 22A and 22B. Specifically, the engine 14 is arranged so as to bridge between both supporting frames 22A and 22B in a state where an output shaft 14a (refer to FIG. 5) of the engine 14 is arranged along the left-right direction.

The generator motor 15 is connected to the engine 14. Specifically, the generator motor 15 is fixed by a bolt B4 to a right end part of the engine 14 and extends rightward from the right end part of the engine 14.

In addition, as shown in FIG. 3, the generator motor 15 includes a facing section 15a which faces the bottom plate 21 at a position separated from both supporting frames 22A and 22B (in the present embodiment, a position separated rightward from the right-side supporting frame 22A) in a plan view, and an overlapping section 15b which overlaps with the supporting frame 22A in a plan view.

Hereinafter, a specific configuration of the generator motor 15 will be described with reference to FIG. 5.

The generator motor 15 includes a rotor 26 connected to the output shaft 14a of the engine 14, a stator 27 provided around the rotor 26, and a casing 28 which houses the rotor 26 and the stator 27.

The casing 28 includes a cylindrical section 28a which is centered on a rotary shaft of the rotor 26 and which is formed in a cylindrical shape, a plate-like section 28b attached to a right end part of the cylindrical section 28a, and a seal member (not shown) which is sandwiched between an peripheral edge of the plate-like section 28b and the right end part of the cylindrical section 28a. The seal member regulates passage of liquids between the plate-like section 28b and the cylindrical section 28a.

Figure 4:
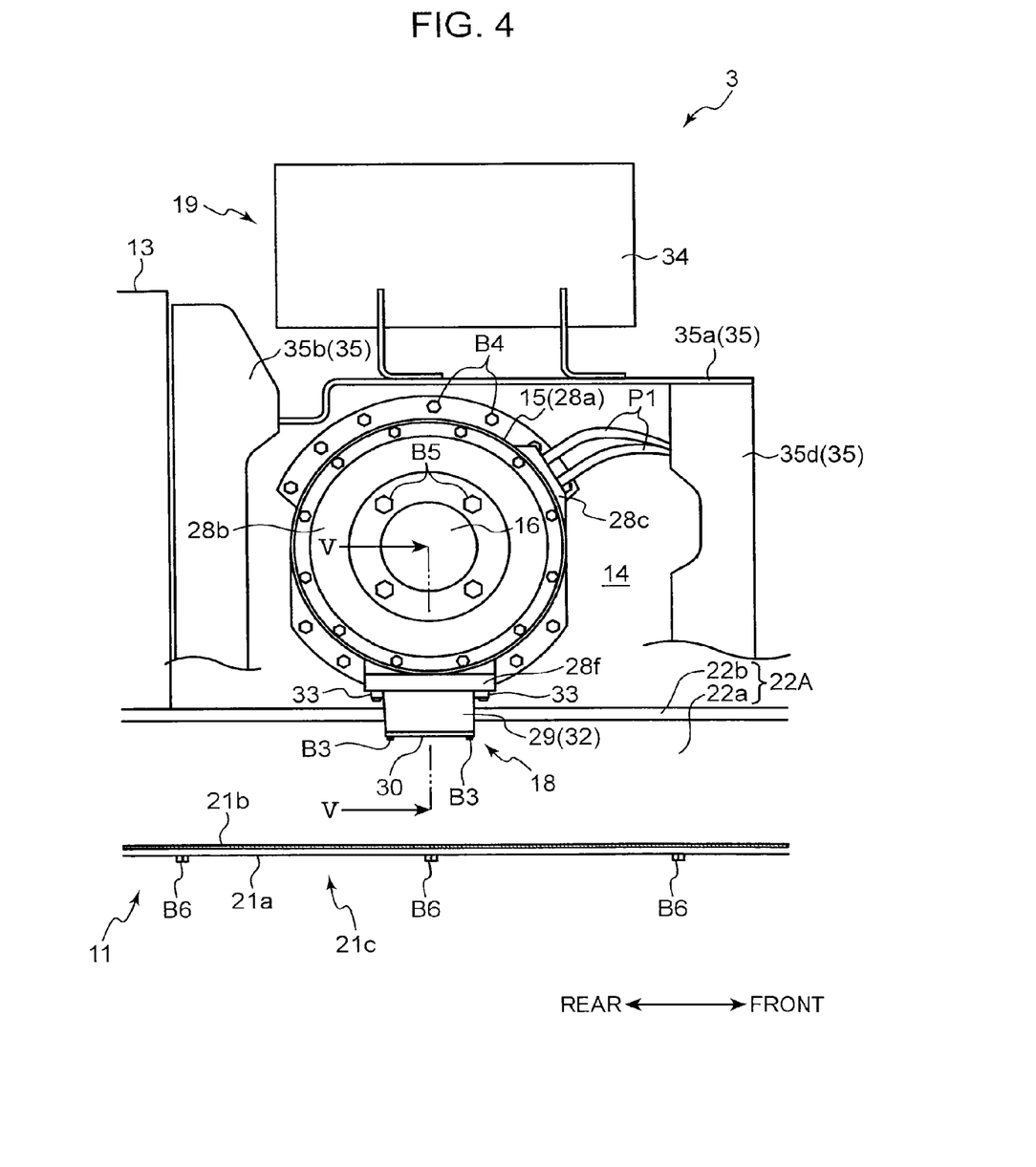
FIG. 4 is a sectional view taken along line IV-IV in FIG. 3.

The cylindrical section 28a includes a coolant passage 28e through which a coolant passes and a pipe connecting section (refer to FIG. 4) 28c which is communicated with the coolant passage 28e and to which a coolant pipe P1 is connected. As the coolant is introduced into the coolant passage 28e through the coolant pipe P1 and cools the cylindrical section 28a, the stator 27 and the rotor 26 housed in the cylindrical section 28a are cooled. As shown in FIG. 4, the pipe connecting section 28c is provided in an upper part of a front surface of the cylindrical section 28a and the coolant pipe P1 extends diagonally forward and upward from the pipe connecting section 28c.

Figure 5:
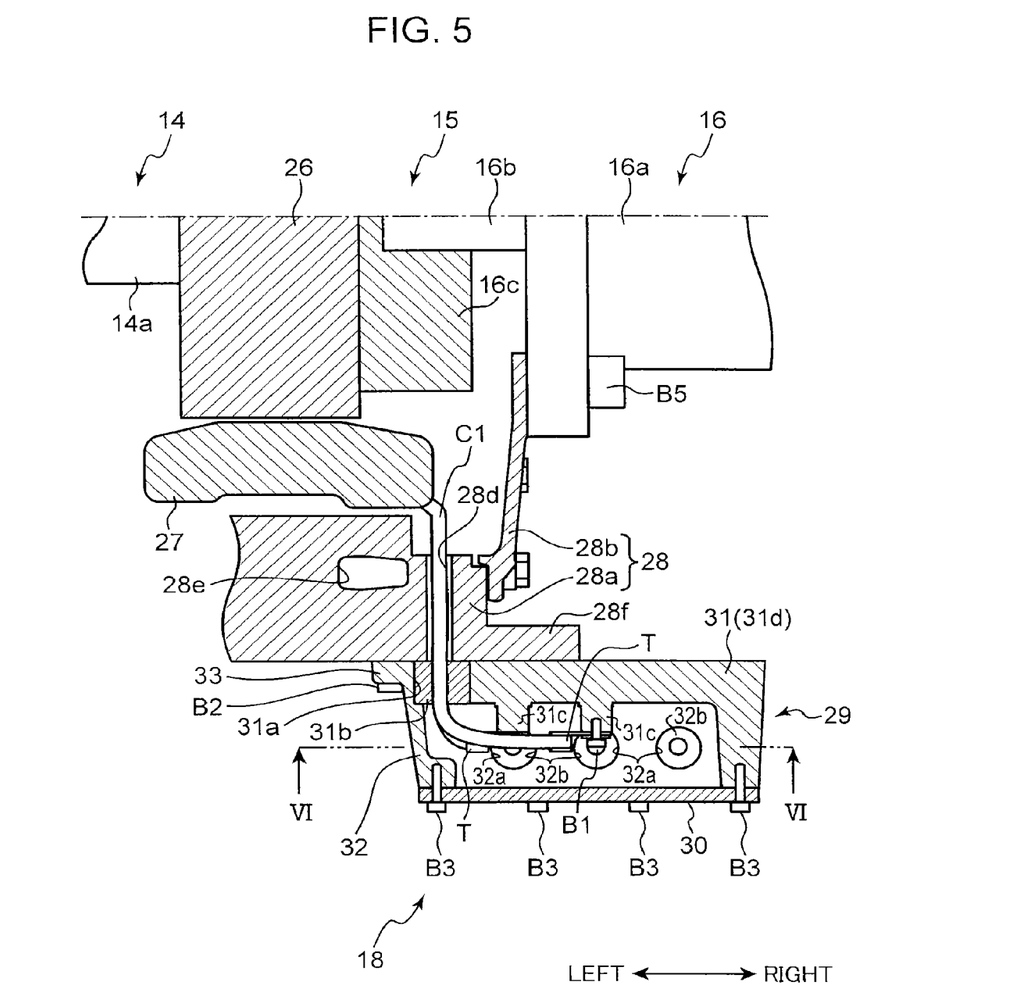
FIG. 5 is a sectional view taken along line V-V in FIG. 4.

With reference to FIG. 5, the hydraulic pump 16 is attached to the plate-like section 28b of the casing 28.

The hydraulic pump 16 supplies operating oil to a hydraulic actuator (for example, cylinders 8 to 10 (refer to FIG. 1) and a traveling motor and a rotating motor (both not shown)) to operate the hydraulic actuator.

Specifically, the hydraulic pump 16 includes a pump main body 16a attached to a right-side surface of the plate-like section 28b of the generator motor 15 by a bolt B5 and a driving shaft 16b extending leftward from the pump main body 16a. The pump main body 16a extends rightward from the generator motor 15 (the plate-like section 28b). The driving shaft 16b extends to the inside of the cylindrical section 28a of the generator motor 15 though a through-hole (not assigned a reference numeral) formed on the plate-like section 28b and is connected to the rotor 26 via a coupling 16c.

With reference to FIGS. 3 and 4, the exhaust gas post-treatment device 19 includes a post-treatment device main body 34 which purifies exhaust gas of the engine 14 and a stand 35 which supports the post-treatment device main body 34 so that the post-treatment device main body 34 is arranged above the generator motor 15 and the hydraulic pump 16.

The post-treatment device main body 34 includes a first treatment section (not assigned a reference numeral) which removes particulate matter (hereinafter referred to as PM) in the exhaust gas of the engine 14 and a second treatment section (not assigned a reference numeral) which removes NOx in the exhaust gas of the engine 14.

The first treatment section includes a filter (diesel particulate filter: hereinafter referred to as DPF) for trapping PM.

The second treatment section is configured to remove NOx due to a reaction of selective catalytic reduction (hereinafter referred to as SCR) using a liquid reducing agent and includes a catalyst for promoting the SCR reaction.

The stand 35 includes a placing plate 35a on which the post-treatment device main body 34 is to be placed and legs 35b, 35c, and 35d which support the placing plate 35a on the bottom plate 21. The legs 35b and 35c stand on the upper frame 11 behind the hydraulic pump 16. In addition, although not shown, a lower part of the leg 35c is bent leftward and arranged behind the generator motor 15. Furthermore, the leg 35d stands on the upper frame 11 in front of the hydraulic pump 16.

A configuration of a periphery of the generator motor 15 may be summarized as follows.

The engine 14 is provided to the left of the generator motor 15 and the hydraulic pump 16 is provided to the right of the generator motor 15. In addition, the coolant pipe P1 is arranged in front of the generator motor 15 and a lower part (not shown) of the leg 35c of the stand 35 is provided behind the generator motor 15. The placing plate 35a of the stand 35 is provided above the generator motor 15 and the post-treatment device main body 34 is placed on the placing plate 35a.

As described above, since other devices are provided in a space around the generator motor 15 in a plan view and in a space above the generator motor 15, arranging the terminal box 18 (to be described later) in these spaces causes a decline in a degree of freedom of layout of the configuration described above.

In consideration thereof, as shown in FIG. 3, the terminal box 18 is arranged between the facing section 15a of the generator motor 15 and the bottom plate 21 (the cover 21b). In addition, the terminal box 18 is arranged at a position separated to the right side from the overlapping section 15b of the generator motor 15 (a position on the right side of the right-side supporting frame 22A) in a plan view. Furthermore, a lower end of the terminal box 18 is arranged lower than an upper end of a portion that overlaps with the overlapping section 15b of the supporting frame 22A in a plan view (an upper end of the supporting frame 22A shown in FIG. 3).

Hereinafter, the terminal box 18 will be described with reference to FIGS. 2 and 4 to 6.

The terminal box 18 includes three terminals T (terminals T connected to three cables C1) which are electrically connected to the generator motor 15 and which allow a cable C2 to be connected and a box main body (a main body section 29 and a lid section 30) which house the terminals T and which is attached to the generator motor 15.

The cables C1 are arranged across the inside of the casing 28 and the outside of the casing 28 of the generator motor 15 through a through-hole 28d formed in a lower part of the cylindrical section 28a of the casing 28. Ends of the cables C1 inside the casing 28 are electrically connected to the stator 27 of the generator motor 15. On the other hand, ends (the terminals T) of the cable C1 outside the casing 28 are held by the main body section 29 of the terminal box 18.

The main body section 29 includes a top plate 31, a peripheral wall 32 extending downward from an outer peripheral edge of the top plate 31, and an attached section 33 which extends forward and backward from the top plate 31 and which is attached to a lower surface (a surface arranged lowest) of the casing 28 by a bolt B2. In addition, a lower end of the casing 28 includes an extending section 28f which extends more rightward than other portions of the casing 28, and the attached section 33 is attached to the extending section 28f and to a portion on a left side of the extending section 28f of the casing 28.

The top plate 31 includes a top plate main body 31d which has an approximately rectangular shape in a plan view, a grommet 31b which is provided inside a through-hole 31a that vertically penetrates the top plate main body 31d, and three terminal holding sections 31c which protrude downward from a lower surface of the top plate main body 31d. The three cables C1 are arranged from above to below the top plate main body 31d through the through-hole 31a and the grommet 31b in a state where the cables C1 are arranged side by side in a front-rear direction.

Figure 6:
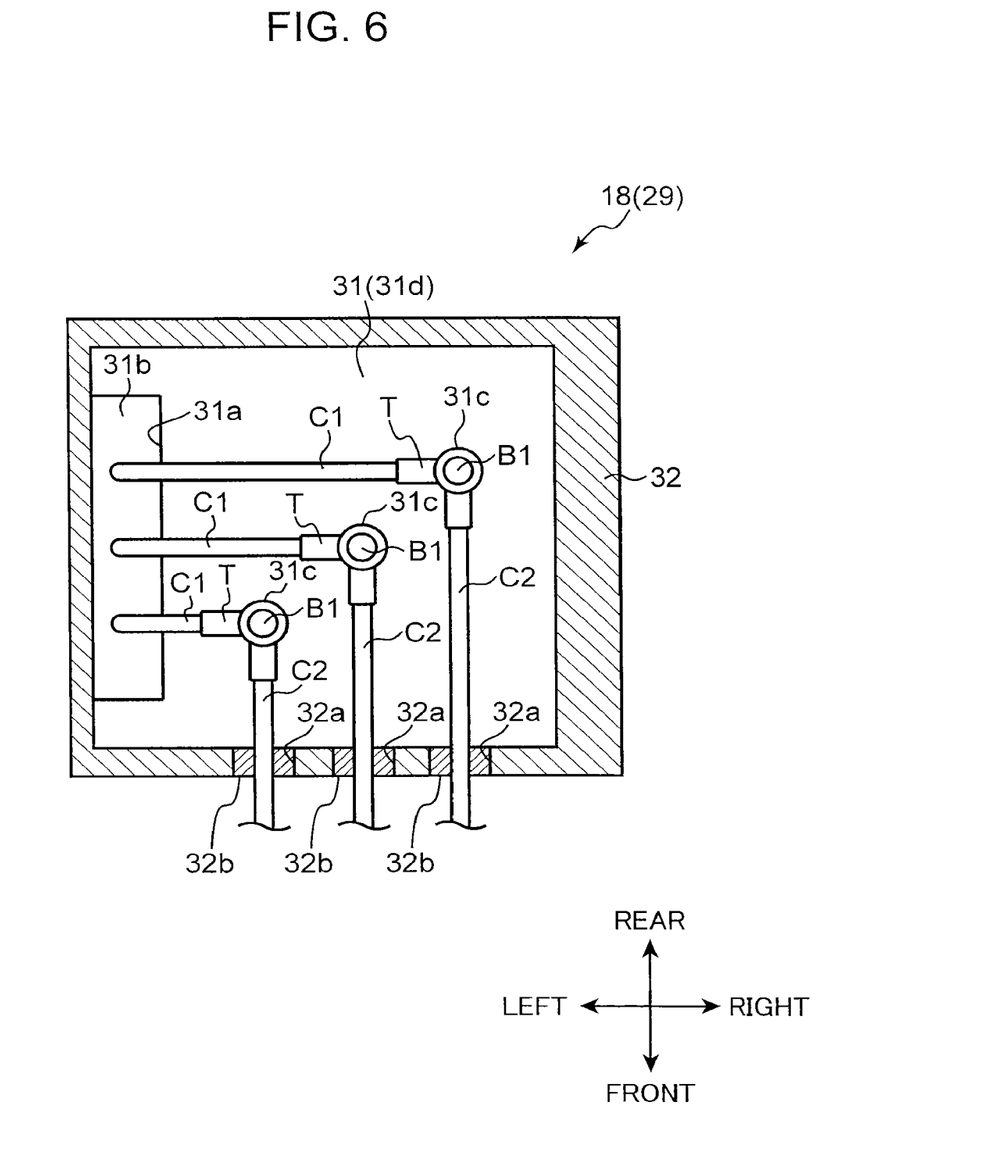
FIG. 6 is a sectional view taken along line VI-VI in FIG. 5.

The terminal holding sections 31c hold the terminals T of the three cables C1 in a state where the terminals T are arranged on a first surface which is parallel to the bottom plate 21 (a surface parallel to a plane of section of a sectional view shown in FIG. 6). Specifically, the terminal holding sections 31c include a female screw hole into which a bolt B1 is screwable and hold the terminal T of the cable C1 by sandwiching the terminal T between a head of the bolt B1 and a lower surface of the terminal holding sections 31c.

In addition, the three terminal holding sections 31c are arranged at positions which differ from one another in a left-right direction and which differ from one another in a front-rear direction. Therefore, the cables C1 that are arranged side by side in the front-rear direction can be arranged toward the terminal holding sections 31c without getting tangled with each other and, at the same time, the three cables C2 connected to the three terminal holding sections 31e that are arranged side by side in the left-right direction can be arranged toward the front without getting tangled with each other.

The peripheral wall 32 has a shape that encloses the three terminal holding sections 31c and the ends of the cables C1 and C2 which are connected to the terminal holding sections 31c over an entire circumference around an axis along a vertical direction. Specifically, the peripheral wall 32 includes a right wall and a left wall which are arranged in the front-rear direction and a front wall and a rear wall which are arranged in the left-right direction. The front wall of the peripheral wall 32 includes a through-hole 32a that penetrates the front wall in the front-rear direction to allow the three cables C2 to pass through and a grommet 32b provided in the through-hole 32a. The through-hole 32a is arranged on the first surface described earlier on which the terminals T of the three cables C1 are arranged.

The cables C2 are arranged across the outside (front side) of the front wall and the inside (rear side) of the front wall along the first surface described above through the through-hole 32a and the grommet 32b. Front end parts of the cables C2 are connected to the inverter 17 (refer to FIG. 2).

The inverter 17 controls operations of the generator motor 15 so that the generator motor 15 operates as a generator due to power from the engine 14 and the generator motor 15 operates as an electric motor due to electric power from a power source (not shown; an electric power storage device or the like). Specifically, the inverter 17 is electrically connected to the terminal box 18 via the cables C2, supplies electric power from a power source (not shown) to the generator motor 15 via the cables C2, and supplies electric power supplied from the generator motor 15 via the cables C2 to the power source.

In addition, as shown in FIG. 2, among the three spaces divided above the bottom plate 21 by the supporting frames 22A and 22B, the inverter 17 is arranged in a space on the right side of the right-side supporting frame 22A or, in other words, the same space as the terminal box 18 in front of the terminal box 18. Therefore, the cables C2 are arranged between the inverter 17 and the terminal box 18 without exceeding or penetrating the supporting frames 22A and 22B.

In this case, as shown in FIGS. 2, 5, and 6, the front wall of the peripheral wall 32 corresponds to a device-side wall that faces a side of the inverter 17 (a front side). Since the through-hole 32a is provided on the device-side wall, the length of the cables C2 that connect the inverter 17 and the terminal box 18 to each other can be reduced.

In addition, the peripheral wall 32 includes an opening (not assigned a reference numeral) which opens the terminal holding sections 31c and the terminals of the cables C1 and C2 held by the terminal holding sections 31c to below. The lid section 30 is detachably attached to a lower end section of the peripheral wall 32 by a bolt B3 so as to close the opening of the peripheral wall 32.

As shown in FIGS. 2 and 3, the opening 21c formed on the bottom plate main body 21a of the upper frame 11 is provided at a position overlapping with the terminal box 18 in a plan view. Therefore, by loosening the bolt B6 and detaching the cover 21b from the bottom plate main body 21a, the terminal box 18 is opened to an opposite side to the terminal box 18 of the bottom plate 21 through the opening 21c. In this state, a worker can perform maintenance of the terminal box 18. In addition, by loosening the bolt B3 and detaching the lid section 30 from the peripheral wall 32, a worker can perform maintenance of the inside of the terminal box 18 through the opening 21c.

As described above, the terminal box 18 is arranged using a dead space that is formed between the generator motor 15 (the facing section 15*a*) and the bottom plate 21 in a state where the engine 14 is supported on the bottom plate 21 by the pair of supporting frames 22A and 22B.

Accordingly, since the terminal box 18 can be arranged at a position overlapping with the generator motor 15 (the facing section 15*a*) in a plan view, the terminal box 18 can be prevented from projecting into a space around the generator motor 15 in a plan view and a space above the generator motor 15.

Therefore, the terminal box 18 can be arranged while preventing a degree of freedom of layout of devices from declining.

In addition, the embodiment described above also achieves the following effects.

Since the terminal box 18 is arranged so that an upper part of the supporting frame 22A and a lower part of the terminal box 18 overlap with each other when viewed in a horizontal direction, an upper end position of the generator motor 15 can be kept low.

Since the terminal box 18 and the inverter 17 are arranged in a same space (the space on the right side of the supporting frame 22A) above the bottom plate 21, arranging of the cables C2 can be completed within this space. Accordingly, a length of the cables C2 between the terminal box 18 and the inverter 17 can be reduced and the cables C2 can be arranged in an efficient manner.

Since the through-hole 32*a* is formed on a front wall of the peripheral wall 32 which faces the side of the inverter 17, a change in direction of the cables C2 between the inverter 17 and the box main body (the main body section 29 and the lid section 30) can be suppressed. Accordingly, the length of the cables C2 can be further reduced as compared to a case where a through-hole is provided on a wall other than the front wall.

Since the terminals T of the cables C1 are arranged on a first surface that is parallel to the bottom plate 21, a height dimension of the box main body (the main body section 29 and the lid section 30) which houses the terminals T can be kept small.

Furthermore, since the through-hole provided on the first surface of the box main body enables the cables C2 to be arranged along the first surface, the cables C2 extending from the box main body themselves can be prevented from protruding in a height direction of the box main body.

Therefore, the terminal box 18 and the cables C2 can be arranged between the facing section 15*a* of the generator motor 15 and the bottom plate 21 in an efficient manner.

Maintenance of the box main body (the main body section 29 and the lid section 30) can be performed from below the bottom plate 21 by detaching the cover 21*b* from the bottom plate main body 21*a*.

Moreover, the present invention is not limited to the embodiment described above and, for example, the following aspects can also be adopted.

While an example in which the facing section 15*a* of the generator motor 15 is arranged on the right side of the right-side supporting frame 22A has been described, a position of the facing section 15*a* is not limited to this example. The facing section 15*a* may be provided between both supporting frames 22A and 22B or provided on a left side of the left supporting frame 22B.

While an example in which the output shaft 14*a* of the engine 14 is arranged in the left-right direction has been described, the arrangement of the engine 14 is not limited to this example. For example, the engine 14 can be arranged so that the output shaft 14*a* is oriented in the front-rear direction. In this case, the arrangements of the generator motor 15 and the hydraulic pump 16 can also be appropriately adjusted in accordance with the orientation of the output shaft 14*a*.

While an example in which three terminals T of the cables C1 (three cables C1) are provided has been described, the number of terminals T is not limited thereto. At least one terminal T need only be provided.

While an example in which the lower end of the terminal box 18 is arranged lower than the upper end of the supporting frame 22A has been described, the lower end of the terminal box 18 may be arranged above the upper end of the supporting frame 22A.

While an example in which the terminal box 18 and the inverter 17 are arranged in a same space among three spaces divided above the bottom plate 21 by the supporting frames 22A and 22B has been described, the terminal box 18 and the inverter 17 may be arranged in different spaces. In addition, the terminal box 18 and the inverter 17 may be arranged in the space between both supporting frames 22A and 22B or in the space on the left side of the supporting frame 22B.

While an example in which the through-hole 32*a* is provide on the front wall of the peripheral wall 32 has been described, the position of the through-hole 32*a* is not limited thereto. For example, a through-hole can be provided on a wall of the peripheral wall 32 other than the front wall or on the lid section 30.

While an example in which the three terminals T and the through-hole 32*a* are arranged on a first surface that is parallel to the bottom plate 21 has been described, positions of the terminals T of the cables C1 and the through-hole 32*a* are not limited to this example. For example, the three terminals T may be arranged on a flat surface that is perpendicular to the bottom plate 21. In addition, the through-hole 32*a* may be arranged on a surface other than the surface on which the terminals T are arranged.

While the terminal box 18 on which one through-hole 31*a* for passing the three cables C1 and three through-holes 32*a* for passing the three cables C2 are formed has been described, the number of through-holes is not limited thereto and any number of through-holes may be adopted as long as all of the necessary cables can be passed through the through-holes.

In addition, the construction machine is not limited to a shovel and may instead be a crane or a dismantling machine.

The specific embodiment described above mainly includes an invention configured as described below.

The present invention provides an upper slewing body rotatably provided on a lower traveling body of a construction machine, the upper slewing body of a construction machine including: a bottom plate rotatably attached to the lower traveling body; a pair of supporting frames standing on the bottom plate; an engine supported on the bottom plate by the pair of supporting frames; a generator motor connected to the engine; and a terminal box including at least one terminal, which is electrically connected to the generator motor and allows cable to be connected, and a box main body housing the at least one terminal and being attached to the generator motor, wherein the generator motor includes a facing section facing the bottom plate at a position separated from the supporting frames in a plan view, and the terminal box is arranged between the facing section of the generator motor and the bottom plate.

According to the present invention, the terminal box is arranged using a dead space that is formed between the generator motor (the facing section) and the bottom plate in a state where the engine is supported on the bottom plate by the pair of supporting frames.

Accordingly, since the terminal box can be arranged at a position overlapping with the generator motor (the facing section) in a plan view, the terminal box can be prevented from projecting into a space around the generator motor in a plan view and a space above the generator motor.

Therefore, according to the present invention, a terminal box can be arranged while preventing a degree of freedom of layout of devices from declining.

In this case, when the generator motor has an overlapping section overlapping with the supporting frames in a plan view, the terminal box may be provided so that a lower end of the terminal box is arranged above an upper end of a portion which overlaps with the overlapping section of the supporting frames in a plan view. However, in this case, the position of the upper end of the generator motor becomes equivalent to a case where the terminal box and the generator motor are stacked on top of the supporting frames and causes a height of the upper slewing body to increase.

In consideration thereof, favorably, the terminal box is arranged at a position separated from the overlapping section of the generator motor in a plan view and a lower end of the terminal box is arranged below an upper end of a portion which overlaps with the overlapping section of the supporting frames in a plan view.

According to this aspect, since the terminal box is arranged so that an upper part of the supporting frames and a lower part of the terminal box overlap with each other when viewed in a horizontal direction, an upper end position of the generator motor can be kept low.

In this case, a configuration can be adopted in which the upper slewing body further includes a connecting device electrically connected to the terminal box via the cable, and the pair of supporting frames extends from a front part of the bottom plate to a rear part of the bottom plate so as to divide a space above the bottom plate into three spaces in a plan view.

In this configuration, although the connecting device and the terminal box may be respectively arranged in different spaces, arranging the connecting device and the terminal box in different spaces necessitates arranging cables over or through the supporting frames.

In consideration thereof, in the configuration described above, the terminal box and the connecting device are favorably arranged in a same space among the three spaces.

According to this aspect, since arranging of the cable can be completed within the space in which the terminal box and the connecting device are provided, a cable length between the terminal box and the connecting device can be reduced and the cable can be arranged in an efficient manner.

Although not intended to limit an orientation in which the cable is inserted into the box main body, favorably, in the upper slewing body, the box main body includes a device-side wall facing the side of the connecting device, and the device-side wall has a through-hole allowing the cable to be arranged from a side of the connecting device of the device-side wall to an inner side of the device-side wall.

According to this aspect, since a change in direction of the cable from the connecting device to the inside of the box main body can be suppressed, a cable length can be further reduced as compared to a case where a through-hole is provided on a wall other than the device-side wall.

In this case, although the terminal box may include a plurality of terminals arranged at positions which differ from each other in a direction perpendicular to the bottom plate, this causes an increase in height of the box main body which houses the terminals and makes it difficult to arrange the terminal box between the facing section of the generator motor and the bottom plate.

In consideration thereof, favorably, in the upper slewing body, the terminal box includes a plurality of terminals arranged on a first surface that is parallel to the bottom plate, and the box main body includes a through-hole which is arranged on the first surface and which allows the cable to be arranged along the first surface from outside of the box main body to inside of the box main body.

According to this aspect, since the plurality of terminals are arranged on the first surface that is parallel to the bottom plate, a height dimension of the box main body which houses the terminals can be kept small.

Furthermore, since the through-hole provided on the first surface of the box main body enables the cable to be arranged along the first surface, the cable extending from the box main body itself can be prevented from protruding in a height direction of the box main body.

Therefore, according to this aspect, the terminal box and the cable can be arranged between the facing section of the generator motor and the bottom plate in an efficient manner.

When the terminal box is arranged in a limited space between the facing section of the generator motor and the bottom plate as described above, it is difficult to perform maintenance of the terminal box on the bottom plate.

In consideration thereof, favorably, in the upper slewing body, the bottom plate includes a bottom plate main body which has an opening that opens the box main body to an opposite side to the box main body of the bottom plate and a cover which is detachably attached to the bottom plate main body so as to close the opening.

According to this aspect, maintenance of the box main body can be performed from below the bottom plate by detaching the cover from the bottom plate main body.

This application is based on Japanese Patent application No. 2015-084245 filed in Japan Patent Office on Apr. 16, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An upper slewing body rotatably provided on a lower traveling body of a construction machine, the upper slewing body of the construction machine comprising:
    a bottom plate rotatably attached to the lower traveling body;
    a pair of supporting frames standing on the bottom plate;
    an engine supported on the bottom plate by the pair of supporting frames;
    a generator motor connected to the engine; and
    a terminal box including at least one terminal, which is electrically connected to the generator motor and allows cable to be connected, and a box main body housing the at least one terminal and being attached to the generator motor, wherein
    the generator motor includes a facing section facing the bottom plate at a position separated from the supporting frames in a plan view, and the terminal box is arranged between the facing section of the generator motor and the bottom plate, and attached to a lower surface of the facing section of the generator motor.

2. The upper slewing body of a construction machine according to claim 1, further comprising a connecting device electrically connected to the terminal box via the cable, wherein
the pair of supporting frames extends from a front part of the bottom plate to a rear part of the bottom plate so as to divide a space above the bottom plate into three spaces in the plan view, and
the terminal box and the connecting device are arranged in a same space among the three spaces.

3. The upper slewing body of a construction machine according to claim 2, wherein
the box main body includes a device-side wall facing a side of the connecting device, and
the device-side wall has a through-hole allowing the cable to be arranged from a side of the connecting device of the device-side wall to an inner side of the device-side wall.

4. The upper slewing body of a construction machine according to claim 1, wherein
the terminal box includes a plurality of terminals arranged on a first surface that is parallel to the bottom plate, and
the box main body includes a through-hole which is arranged on the first surface and which allows the cable to be arranged along the first surface from outside of the box main body to inside of the box main body.

5. An upper slewing body of a construction machine, the upper slewing body of the construction machine comprising:
a bottom plate rotatably attached to the lower traveling body;
a pair of supporting frames standing on the bottom plate;
an engine supported on the bottom plate by the pair of supporting frames;
a generator motor connected to the engine; and
a terminal box including at least one terminal, which is electrically connected to the generator motor and allows cable to be connected, and a box main body housing the at least one terminal and being attached to the generator motor, wherein
the generator motor includes a facing section facing the bottom plate at a position separated from the supporting frames in a plan view,
the terminal box is arranged between the facing section of the generator motor and the bottom plate,
the generator motor includes an overlapping section overlapping with the supporting frames in the plan view,
the terminal box is arranged at a position separated from the overlapping section of the generator motor in the plan view, and
a lower end of the terminal box is arranged below an upper end of a portion which overlaps with the overlapping section of the supporting frames in the plan view.

6. An upper slewing body of a construction machine, the upper slewing body of the construction machine comprising:
a bottom plate rotatably attached to the lower traveling body;
a pair of supporting frames standing on the bottom plate;
an engine supported on the bottom plate by the pair of supporting frames;
a generator motor connected to the engine; and
a terminal box including at least one terminal, which is electrically connected to the generator motor and allows cable to be connected, and a box main body housing the at least one terminal and being attached to the generator motor, wherein
the generator motor includes a facing section facing the bottom plate at a position separated from the supporting frames in a plan view,
the terminal box is arranged between the facing section of the generator motor and the bottom plate, and
the bottom plate includes a bottom plate main body which has an opening that opens the box main body to an opposite side to the box main body of the bottom plate and a cover which is detachably attached to the bottom plate main body so as to close the opening.

* * * * *